(12) United States Patent
Imaseki

(10) Patent No.: US 9,247,107 B2
(45) Date of Patent: Jan. 26, 2016

(54) METHOD FOR VERIFYING COLOR MATCHING PRECISION, AND STORAGE MEDIUM STORED WITH PROGRAM FOR IMAGE FORMING SYSTEM

(71) Applicant: KONICA MINOLTA, INC., Chiyoda-ku (JP)

(72) Inventor: Rumi Imaseki, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/614,459

(22) Filed: Feb. 5, 2015

(65) Prior Publication Data

US 2015/0304523 A1 Oct. 22, 2015

(30) Foreign Application Priority Data

Feb. 6, 2014 (JP) .................................. 2014-021625

(51) Int. Cl.
*H04N 1/60* (2006.01)
*G06K 15/02* (2006.01)

(52) U.S. Cl.
CPC ..................................... *H04N 1/603* (2013.01)

(58) Field of Classification Search
None
See application file for complete search history.

(56) References Cited

U.S. PATENT DOCUMENTS

| 6,963,425 B1 * | 11/2005 | Nair ..................... G06K 9/4652 358/1.9 |
| 2008/0259369 A1 * | 10/2008 | Kanai ................... G06T 11/001 358/1.9 |

FOREIGN PATENT DOCUMENTS

JP 2004-194354 A 7/2004

* cited by examiner

*Primary Examiner* — Quang N Vo
(74) *Attorney, Agent, or Firm* — Buchanan Ingersoll & Rooney PC

(57) ABSTRACT

A method for verifying a color matching precision includes determining a relationship in a magnitude of a distance X, a distance A, and a distance B, which are respectively distances between an achromatic color point and a new target color gamut point on a boundary of a new target color gamut, a verified target color gamut point on a boundary of a verified target color gamut, and a printer color gamut point on a boundary of a printer color gamut having a same hue. When X is more than A and B is less than A and X, a color matching precision of a new target color gamut point is verified by calculating a color difference between the new target color gamut point and a measured color value of the verified target color gamut point having the same hue as the new target color gamut point.

8 Claims, 10 Drawing Sheets

METHOD FOR VERIFYING COLOR MATCHING PRECISION, AND STORAGE MEDIUM STORED WITH PROGRAM FOR IMAGE FORMING SYSTEM

CROSS-REFERENCE TO RELATED APPLICATION

This application is based on Japanese Patent Application No. 2014-021625 filed on Feb. 6, 2014, the contents of which are incorporated herein by reference.

BACKGROUND

1. Technical Field

The present invention relates to a method for verifying color matching precision and a storage medium stored with program for an image forming system.

2. Description of Related Art

In recent years, data received from a customer is often printed by making use of an on-demand printing device such as an electro-photographic printer and an inkjet printer. Under such circumstances, it is requested to verify the color matching precision of the printed material for a target (specification) designated by the customer and submit the verification result as well as the printed material to the customer.

The verification of the color matching precision is performed by printing a chart including multiple color patches and measuring the colors, and calculating a color difference between a measured color value (L*a*b*) and a specification value of the target (L*a*b*).

However, there are various targets designated by the customer, and it takes a time to print the charts corresponding to the targets and measure the color every time the target changes, so that there is a problem in that the color matching precision cannot be verified efficiently.

A conventional technique for efficiently verifying the color matching precision includes a technique described in Unexamined Japanese Patent Publication No. 2004-194354. That is, color reproducibility of an unknown sheet is predicted on the basis of a difference between a measured color value of each patch of the chart printed on a reference sheet and a measured color value of a chart printed on an unknown sheet by subtracting the patch. Therefore, the number of patches for measuring the colors is reduced, and the color matching precision is verified in an easy and efficient manner.

SUMMARY

However, when a new target color gamut of which color registration correction precision is to be verified is larger than the verified target color gamut that has already been verified, the conventional technique described above has a problem in that the color reproducibility in an unverified color gamut in the new target color gamut cannot be predicted.

The present invention is made to solve such a problem. More specifically, in the present invention, a relationship in a magnitude of a distance X, a distance A, and a distance B is determined, which are respectively, in a device-independent space, distances between an achromatic color point and a new target color gamut point on a boundary of a new target color gamut, a verified target color gamut point on a boundary of a verified target color gamut, and a printer color gamut point on a boundary of a printer color gamut having a same hue. In a case where the distance X is determined to be more than the distance A and the distance B is determined to be less than the distance A and the distance X, a color matching precision of a new target color gamut point is verified by calculating a color difference between the new target color gamut point and a measured color value of the verified target color gamut point having the same hue as the new target color gamut point. Therefore, the color difference of the non-verified new target color gamut is estimated from the measured color value of the verified target color gamut point in view of the printer color gamut, and it is an object to further reduce the number of patches for measuring the color, and more efficiently achieve the verification of the color matching precision.

To achieve at least one of the abovementioned objects, a method for verifying color matching precision reflecting one aspect of the present invention comprises the followings.

(1) A method for verifying a color matching precision, comprising the steps of: (a) determining, in a device-independent color space, a relationship in a magnitude of a distance X between an achromatic color point indicating an achromatic color and a new target color gamut point on a boundary of a new target color gamut for which color matching precision is newly verified, a distance A between the achromatic color point and a verified target color gamut point on a boundary of a verified target color gamut, for which color matching precision has already been verified, and having a same hue as the new target color gamut point, and a distance B between the achromatic color point and a printer color gamut point on a boundary of a printer color gamut, with which an image can be formed by a printer, and having the same hue as the new target color gamut point; (b) in a case where the distance X is determined to be more than the distance A and the distance B is determined to be less than the distance A and the distance X in the step (a), calculating the new target color gamut point having the same hue as the verified target color gamut point; and, (c) calculating, as the color matching precision of the new target color gamut point, a color difference between the new target color gamut point calculated in the step (b) and a measured color value of an output given by the printer for the verified target color gamut point.

(2) The method for verifying the color matching precision as described in above (1), wherein the verified target color gamut includes at least part of a plurality of target color gamuts for which color matching precisions have already been verified.

(3) The method for verifying the color registration correction precision as described in above (1) further comprising: a step (d) of displaying a relationship between the verified target color gamut, the new target color gamut, and the printer color gamut.

(4) The method for verifying the color matching precision as described in above (1) further comprising: a step (e) of, in a case where a number of particular new target color gamut points, which are the new target color gamut points where the distance X is determined to be more than the distance A and the distance B is determined to be less than the distance A and the distance X in the step (a), is equal to or less than a predetermined threshold value, outputting patches of the particular new target color gamut points with the printer in such a manner that the patches are included in a same chart in which the patches of the new target color gamut point other than the particular new target color gamut points are included.

The objects, features, and characteristics of this invention other than those set forth above will become apparent from the description given herein below with reference to preferred embodiments illustrated in the accompanying drawings.

DETAILED DESCRIPTION

A method for verifying color matching precision, and a storage medium stored with a program for a print system according to an embodiment of the present invention will be hereinafter explained in details with reference to drawings.

Figure 1:
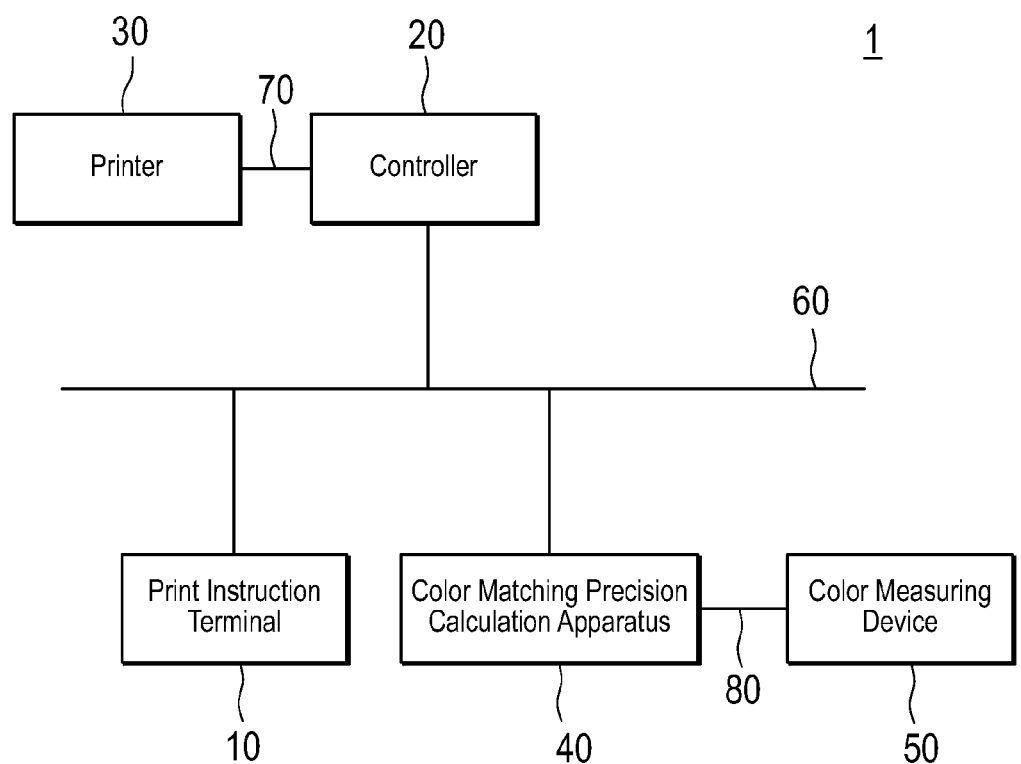
FIG. 1 is a block diagram showing an image forming system for performing a method for verifying color matching precision according to an embodiment of the present invention.

FIG. 1 is a block diagram showing an image forming system for performing the method for verifying color matching precision according to an embodiment of the present invention.

An image forming system 1 includes a print instruction terminal 10, a controller 20, a printer 30, a color matching precision calculation apparatus 40, and a color measuring device 50.

The print instruction terminal 10, the controller 20, and the color matching precision calculation apparatus 40 are connected with each other via a network 60 so as to be able to communicate with each other. The network 60 can be constituted by a wired or wireless LAN (Local Area Network) connecting computers and network devices with each other according to a specification such as Ethernet (registered trademark), BLUETOOTH (registered trademark), IEEE 802.11, and the like, or a WAN (Wide Area Network) connecting LANs via a dedicated line.

The controller 20 and the printer 30 is connected by a dedicated line 70 using a high-speed serial bus interface based on, for example, IEEE 1394 specification. Alternatively, the controller 20 and the printer 30 may be connected by Ethernet.

The color matching precision calculation apparatus 40 and the color measuring device 50 are connected by a dedicated line 80 using USB (Universal Serial Bus), for example.

It should be noted that the controller 20 may be incorporated into the printer 30, and the color matching precision calculation device 40 may be incorporated into the print instruction terminal 10.

Each constituent element of the image forming system 1 will be described.

Figure 2:
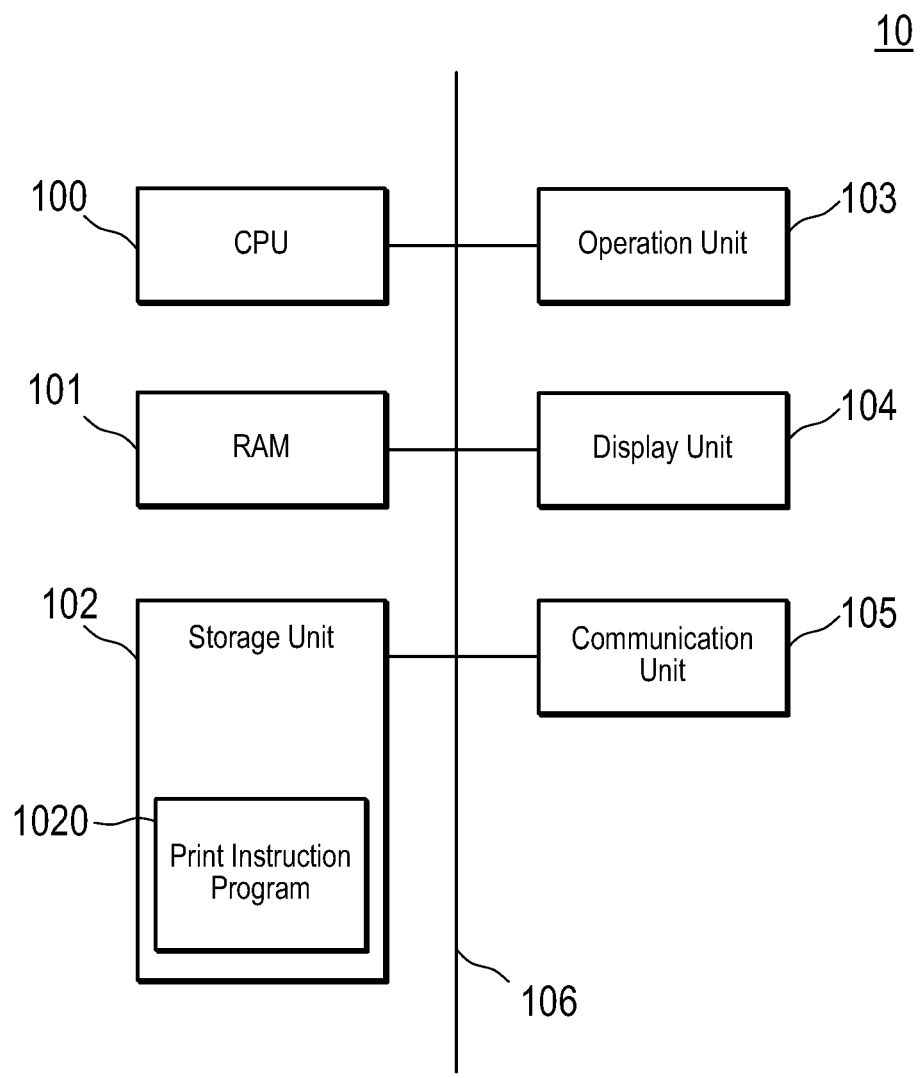
FIG. 2 is a block diagram showing a configuration of a print instruction terminal.

FIG. 2 is a block diagram showing a configuration of the print instruction terminal.

The print instruction terminal 10 includes a CPU (Central Processing Unit) 100, a RAM (Random Access Memory) 101, a storage unit 102, an operation unit 103, a display unit 104, and a communication unit 105, which are connected with each other via a bus 106 for exchanging signals. The print instruction terminal 10 may be made of, for example, a personal computer.

The CPU 100 controls each of the above units and performs various kinds of processing according to the program.

The RAM 101 temporarily stores programs and data as a work area.

The storage unit 102 stores various kinds of programs including the operating system and various kinds of data. The storage unit 102 is made of, for example, a ROM (Read Only Memory) and an HDD (Hard Disk Drive).

The storage unit 102 stores a print instruction program 1020. The print instruction program 1020 includes, for example a printer driver, and is a program for giving a print instruction to the controller 20 in response to user's instruction.

The operation unit 103 includes a pointing device such as a mouse, a keyboard, and a touch panel, and is used to perform various kinds of operations and inputs.

The display unit 104 is, for example, a liquid crystal display, and displays various kinds of information.

The communication unit 105 is an interface for communicating with an external device, and the communication unit 105 uses, e.g., a network interface based on a specification such as Ethernet, SATA (Serial Advanced Technology Attachment), PCI Express, USB, IEEE 1394, and the like, a wireless communication interface based on a specification such as BLUETOOTH, IEEE 802.11, and the like, and a telephone circuit interface for connecting to a telephone circuit.

According to the above configuration, the print instruction terminal 10 gives the print instruction to the controller 20 by causing the CPU 100 to execute the print instruction program 1020. More specifically, the print instruction terminal 10 transmits a print job to the controller 20, so as to give the print instruction for printing an image based on print data included in the print job onto a sheet. The print job is a general term meaning a print command for the printer 30, and the print job includes print data and print setting. The print data is data of a document which is to be printed, and the print data includes various kinds of data such as image data, vector data (graphics data), and text data. More specifically, the print data is, for example, PDL (Page Description Language) data, PDF (Portable Document Format) data or TIFF (Tagged Image File Format) data. The print setting includes a printer with which printing is performed, a designation of a sheet size, and the like.

Figure 3:
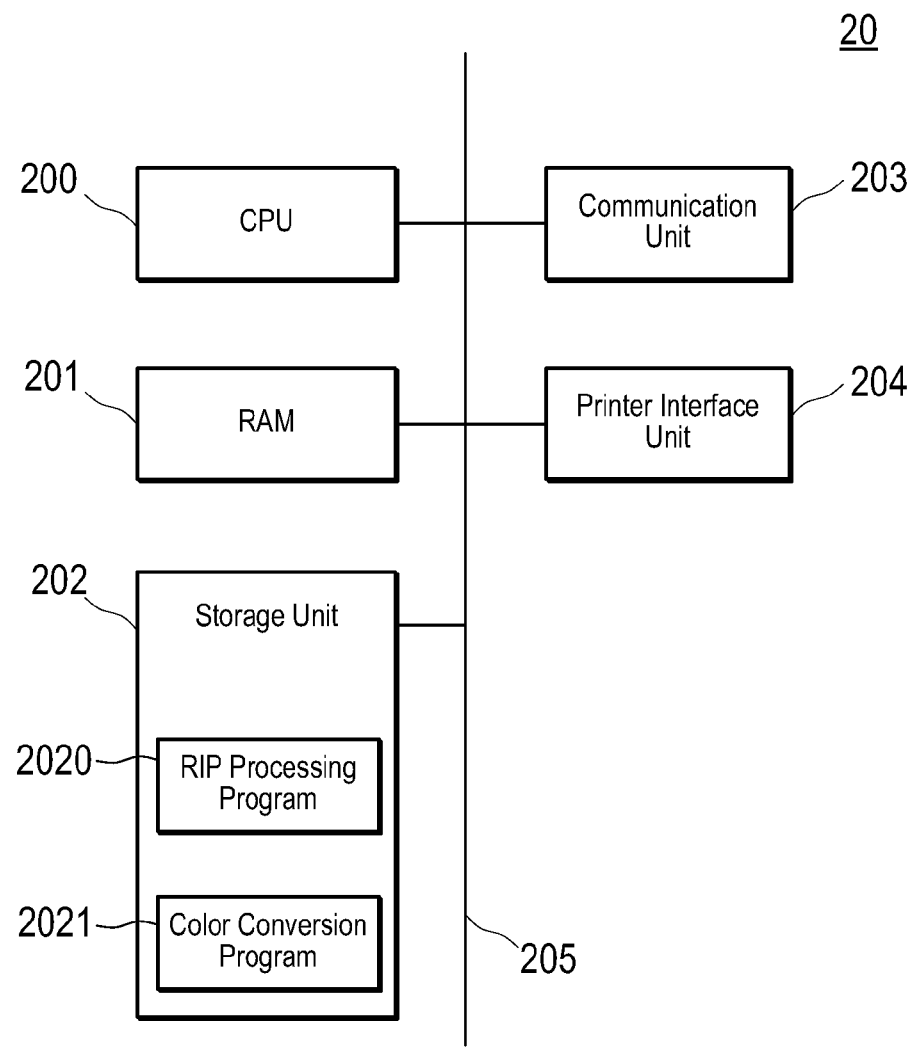
FIG. 3 is a block diagram showing a configuration of a controller.

FIG. 3 is a block diagram showing a configuration of the controller.

The controller 20 includes a CPU 200, a RAM 201, a storage unit 202, a communication unit 203, and a printer interface unit 204, which are connected with each other via a bus 205 for exchanging signals.

The basic functions of the CPU 200, the RAM 201, the storage unit 202, and the communication unit 203 are the same as the corresponding constituent elements of the print instruction terminal 10, and therefore, repeated description thereabout is omitted.

The storage unit 202 includes an RIP (Raster Image Processor) processing program 2020 and a color conversion program 2021. The storage unit 202 stores a target profile, a printer profile, a tone curve, and various kinds of other data.

The RIP processing program 2020 is a program for interpreting print data, converting the print data into a format of image data with which the image can be printed by a printer (for example, a bitmap format), and generate image data for output.

The color conversion program 2021 is a program using the target profile, the printer profile, the tone curve, and the like to convert image data for output into pixel values for the printer 30 in cooperation with the RIP processing program 2020.

The target profile is data for specifying the color conversion of the target color gamut, and has a multi-dimension LUT (Look Up Table) for converting the color of the target color gamut point in the target color gamut from a device-dependent space such as the CMYK color space into a device-independent space such as the L*a*b* color space or vice versa. The target color gamut is an aggregate domain of the target color gamut point, and means a predetermined range in a target device-independent color space or device-dependent color space as a specification.

By referring to the target profile, the target color gamut can be recognized. The target profile includes a verified target profile for defining a color conversion of a verified target color gamut for which color matching precision has already been verified, and a new target profile for defining a color conversion of a new target color gamut for which the user is going to newly verify color matching precision.

The printer profile is data for defining a color conversion to a printer color gamut which is a color gamut that can be printed by the printer 30, and is set for each of the printers 30, and includes a multi-dimension LUT for converting a color in the device-dependent space into a color in the device-independent space or vice versa. By referring to the printer profile, the printer color gamut can be recognized. As described later, by using the printer profile, the hue of a verified target color gamut point can be calculated.

The printer interface unit 204 is an interface for communicating with the printer 30 locally connected.

According to the above configuration, the controller 20 receives the print job from the print instruction terminal 10, converts the print job into image data for output that can be printed by the printer 30, and outputs the image data for output to the printer 30 by converting it into the pixel values for the printer 30.

Figure 4:
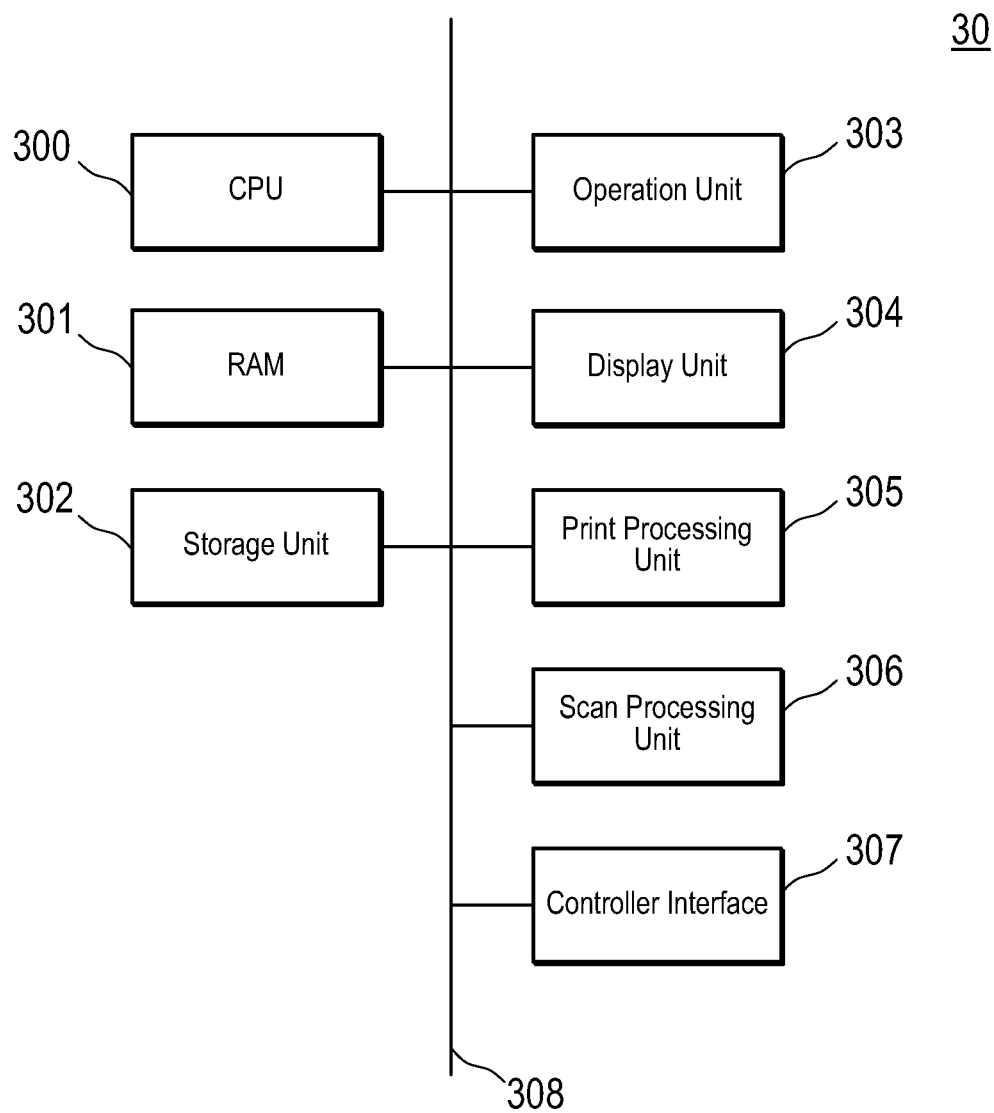
FIG. 4 is a block diagram showing a configuration of a printer.

FIG. 4 is a block diagram showing a configuration of the printer.

The printer 30 includes a CPU 300, a RAM 301, a storage unit 302, an operation unit 303, a display unit 304, a print processing unit 305, a scan processing unit 306, and a controller interface 307, which are connected with each other via a bus 308 for exchanging signals.

The basic functions of the CPU 300, the RAM 301, the storage unit 302, the operation unit 303, and the display unit 304 are the same as the corresponding constituent elements of the print instruction terminal 10, and therefore, repeated description thereabout is omitted.

The printer 30 may be made of, for example, an electrophotographic printer, an inkjet printer, or a heat transfer printing printer.

The print processing unit 305 uses well-known image formation process such as electrophotographic process to print an image based on image data for output onto the sheet.

The scan processing unit 306 emits light, from a light source such as a fluorescent lamp, onto an original document placed at a predetermined reading position of a platen or an original document conveyed to a predetermined reading position by an ADF (Auto Document Feeder), and receives a reflection light therefrom while causing a light reception device such as a CCD (Charge Coupled Device) image sensor and a CMOS (Complementary Metal Oxide Semiconductor) image sensor to scan the original document, thus generating digital data of the original document image.

The controller interface 307 is an interface for communicating with the controller 20 locally connected, for example.

Back to FIG. 1, explanation will be continued. The color measuring device 50 uses a sensor to measure a spectral reflectivity of a patch on a chart printed by the printer 30, converts data of the measured spectral reflectivity into a measured color value of a device-independent color specification system such as L*a*b*value (L*, a*, b*), and transmits the obtained measured color value to the color matching precision calculation apparatus 40.

Figure 5:
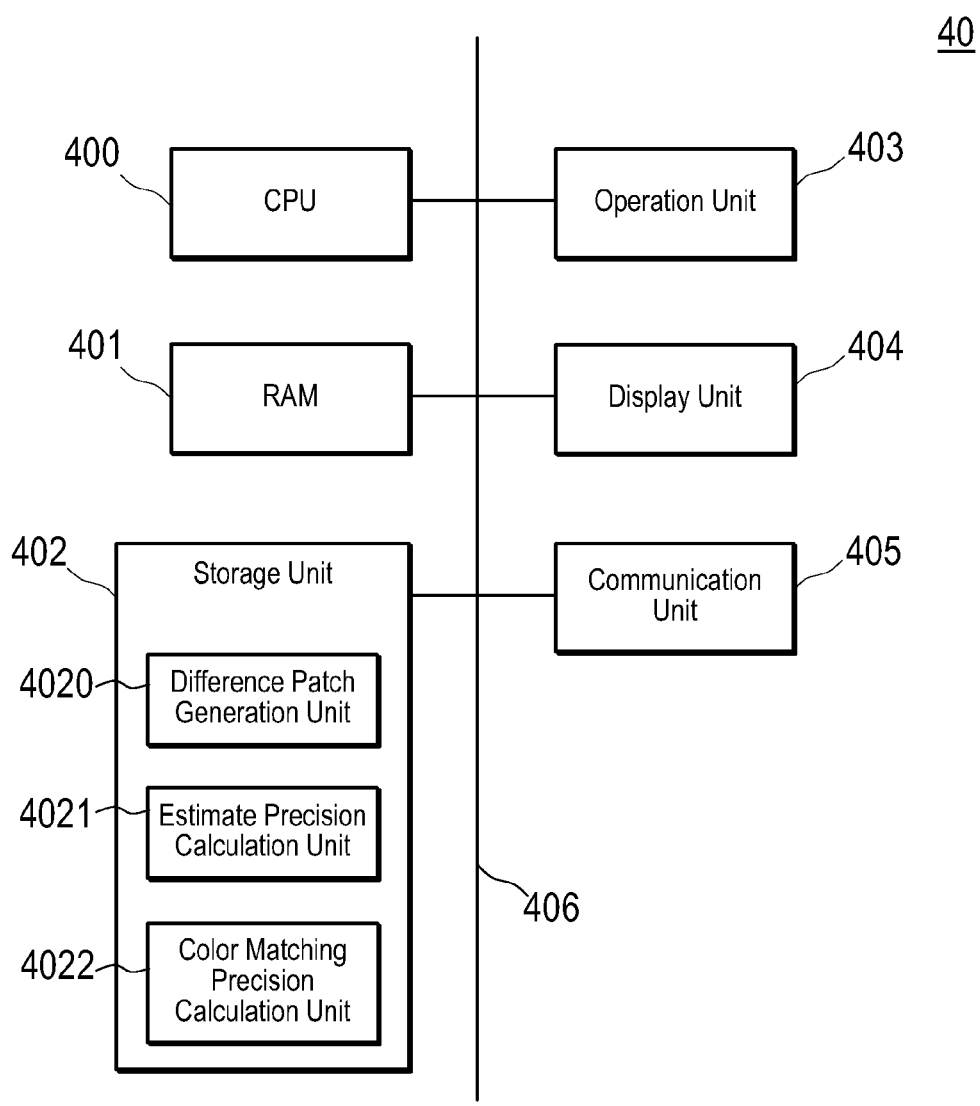
FIG. 5 is a block diagram showing a configuration of a color matching precision calculation apparatus.

FIG. 5 is a block diagram showing a configuration of a color matching precision calculation apparatus.

A color matching precision calculation apparatus 40 includes a CPU 400, a RAM 401, a storage unit 402, an operation unit 403, a display unit 404, and a communication unit 405, which are connected with each other via a bus 406 for exchanging signals.

The basic functions of constituent elements of the color matching precision calculation apparatus 40 described above are the same as the corresponding constituent elements of the print instruction terminal 10, and therefore, repeated description thereabout is omitted.

The storage unit 402 stores a program constituting a difference patch generation unit 4020, an estimate precision calculation unit 4021, and a color matching precision calculation unit 4022, and various kinds of data such as data of color matching precision.

The difference patch generation unit 4020 determines whether a difference patch is to be generated or not from a relationship between the verified target color gamut for which the color matching precision has already been verified, the new target color gamut for which the color matching precision is newly verified, and the printer color gamut that can be printed by the printer. Then, when the difference patch generation unit 4020 determines that it is necessary to generate the difference patches, the difference patch generation unit 4020 generates the difference patches and transmits the difference patches to the controller 20 so as to cause the printer 30 to print the difference patches. The difference patch means a patch for measuring the color of the new target color gamut point for which the color matching precision has not yet been verified, in the new target color gamut.

When the color matching precision of the new target color gamut is already verified (when the new target color gamut is included in the verified target color gamut), the difference patch generation unit 4020 determines that it is not necessary to generate the difference patches. Even when the new target color gamut is larger than the verified target color gamut, the difference patch generation unit 4020 determines that it is not necessary to generate the difference patches for a portion where the color matching precision can be estimated in the portion of the new target color gamut where the color matching precision has not yet been verified as explained below.

When the difference patch generation unit 4020 determines that it is not necessary to generate the difference patches, the estimate precision calculation unit 4021 estimates the color matching precision of the new target color gamut point. The estimate precision calculation unit 4021 estimates the color matching precision of the new target color gamut point by calculating the color difference between the measured color value of the verified target color gamut point having the same hue as that of the new target color gamut point on the boundary of the verified target color gamut and the new target color gamut point.

FIG. 6 is an explanatory diagram for explaining mapping from the verified target color gamut point on the boundary of the verified target color gamut to the printer color gamut. FIG. 7 is an explanatory diagram for explaining an example of a relationship between the verified target color gamut, the new target color gamut, and the printer color gamut, and a method for estimating the color matching precision of a non-verified new target color gamut point. The method for estimating the color matching precision of the non-verified new target color gamut point will be explained with reference to FIGS. 6 and 7.

Figures 6A, 6B:
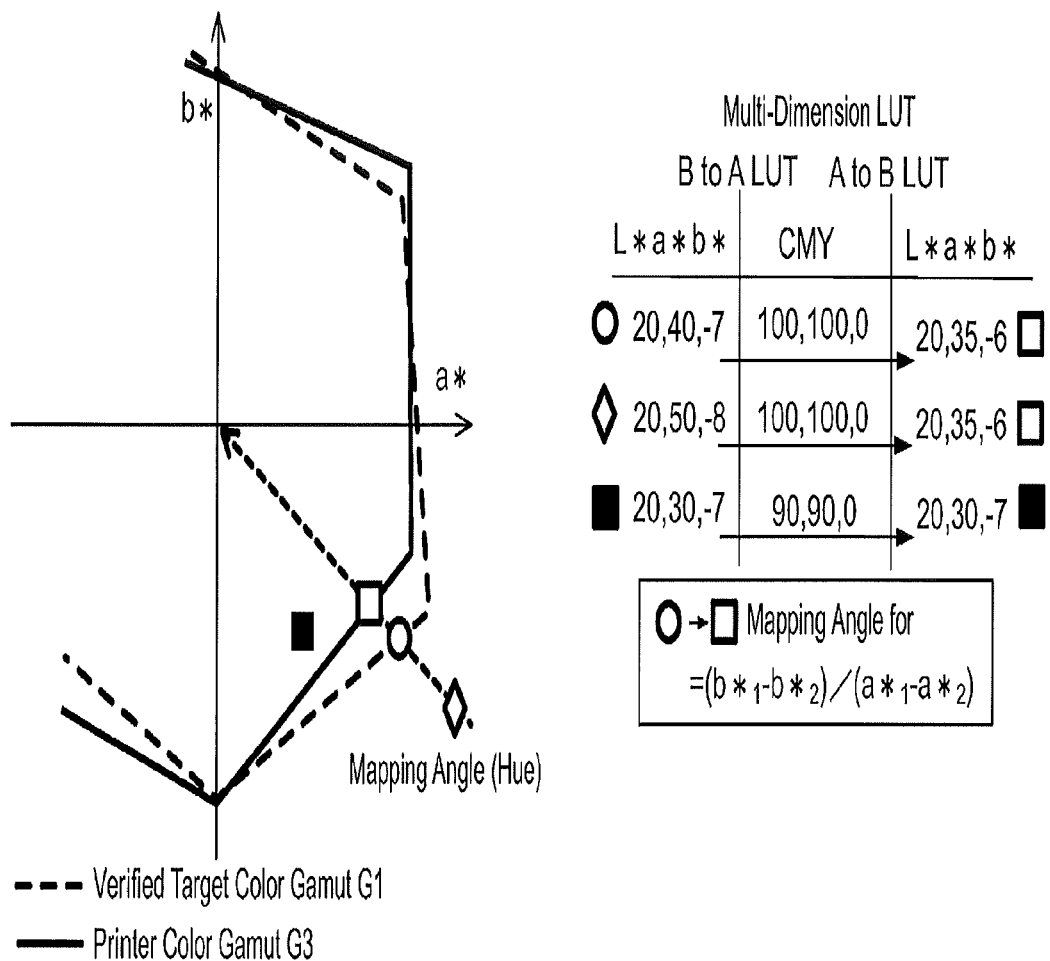
FIGS. 6A and 6B are explanatory diagrams for explaining mapping from a verified target color gamut point on a boundary of a verified target color gamut to a printer color gamut.
Figure 7:
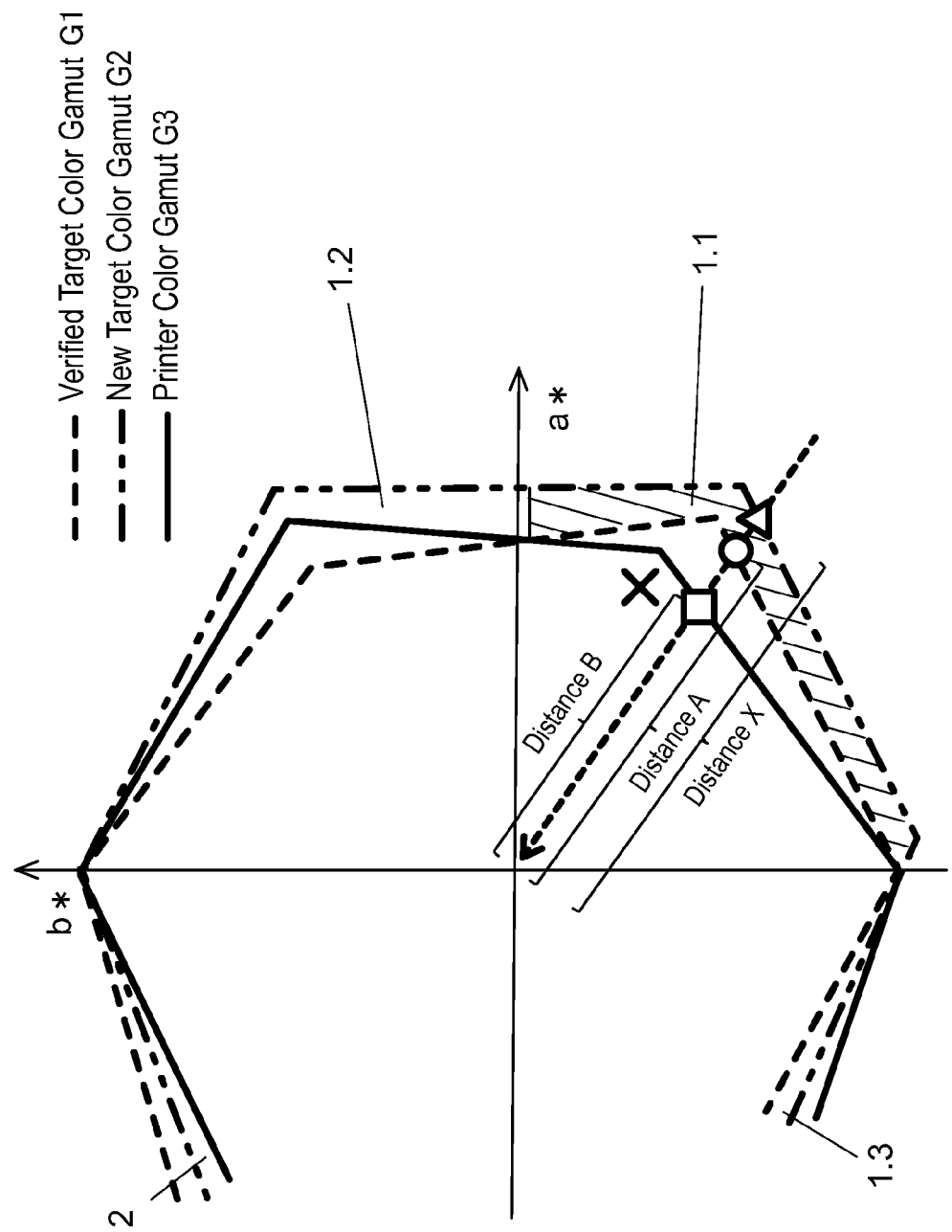
FIG. 7 is an explanatory diagram for explaining an example of a relationship between a verified target color gamut, a new target color gamut, and a printer color gamut, and a method for estimating a color matching precision of a non-verified new target color gamut point.

FIG. 6A shows the verified target color gamut G1 and the printer color gamut G3 on a chromaticity plane with a constant brightness L* in the L*a*b* color space (plane where the chromaticity a*, b* is adopted as an axis). The boundary of the verified target color gamut G1 is indicated by a broken line, and the boundary of the printer color gamut G3 is indicated by a solid line.

When the verified target color gamut point in the verified target color gamut G1 exists in the printer color gamut G3 (for example, a verified target color gamut point indicated by a black square in FIG. 6A), the color at the verified target color gamut point can be reproduced by printing by the printer 30. However, when the verified target color gamut point in the verified target color gamut G1 exists outside of the printer color gamut G3 (for example, a verified target color gamut point indicated by an outline circle of FIG. 6A), the color at the verified target color gamut point cannot be reproduced by printing of the printer 30. Therefore, in order to cause the printer 30 to reproduce a color close to the color at the verified target color gamut point, the verified target color gamut point is mapped to the printer color gamut G3 in general. Mapping is done for each hue, and the verified target color gamut point (outline circle) is mapped to the printer color gamut point on the boundary of the printer color gamut G3 (printer color gamut point indicated by an outline square of FIG. 6A) in the direction of the mapping angle which is the direction of the hue indicated by a dotted line arrow. More specifically, the verified target color gamut point existing outside of the printer color gamut G3 (outline circle) is mapped to the printer color gamut point (outline square) on the boundary of the printer color gamut G3 having the same hue as the verified target color gamut point (outline circle). The direction of the hue indicated by the dotted line arrow is a direction extending from each point on the chromaticity plane to an achromatic color point which is a crossing point of a* axis and b* axis, and each point on the dotted line arrow has the same hue.

A point existing outside of the printer color gamut G3 and outside of the verified target color gamut G1 and having the same hue as the verified target color gamut point (outline circle) (for example, a point indicated by an outline rhombic shape) is also mapped to the printer color gamut point indicated by an outline square.

FIG. 6B is an explanatory diagram for calculating a mapping angle using the multi-dimension LUT included in the printer profile.

The multi-dimension LUT includes a B to A LUT for converting a color from the L*a*b* color space into the CMYK color space and an A to B LUT for converting the color from the CMYK color space into the L*a*b* color space. Using the B to A LUT, the verified target color gamut point (L*, a*, b*)=(20, 40, −7) on the boundary of the verified target color gamut G1 indicated by the outline circle of FIG. 6A in the L*a*b* color space is mapped to (C, M, Y)=(100, 100, 0) in the CMYK color space. Further, by being converted into the L*a*b* color space using the A to B LUT, a verified target color gamut point (L*, a*, b*)=(20, 35, −6) indicated by an outline square after the mapping to the L*a*b* color space is obtained. In the L*a*b* color space, the verified target color gamut point (L*, a*, b*)=(20, 40, −7) before the mapping and the verified target color gamut point (L*, a*, b*)=(20, 35, −6) after the mapping have the same hue on the same chromaticity plane, and therefore, L*=20 indicating the brightness becomes the same.

Where the verified target color gamut points before and after the mapping in the L*a*b* color space are $(a^*, b^*)=(a^*_1, b^*_1)$, and $(a^*, b^*)=(a^*_2, b^*_2)$, respectively, the mapping angle can be calculated by the following expression (1).

$$\text{mapping angle}=(b^*_1-b^*_2)/(a^*_1-a^*_2) \tag{1}$$

As can be understood from FIG. 6B, the verified target color gamut point (outline circle) on the boundary of the verified target color gamut G1 and the point (outline rhombic shape) outside of the verified target color gamut having the same hue as the verified target color gamut point (outline circle) are mapped to the same printer color gamut point (outline square).

The method for estimating the color matching precision of the non-verified new target color gamut point will be explained with reference to FIG. 7.

FIG. 7 shows four cases (1.1, 1.2, 1.3, and 2) classified from the perspective of the method for estimating the color matching precision of the new target color gamut point and whether it is necessary to generate the patch or not with regard to the relationship among the verified target color gamut G1, the new target color gamut G2, and the printer color gamut G3. In FIG. 7, the boundary of the verified target color gamut G1 is indicated by the broken line, the boundary of the new target color gamut G2 is indicated by a chain double-dashed line, and the boundary of the printer color gamut G3 is indicated by a solid line.

The relationship among the verified target color gamut G1, the new target color gamut G2, and the printer color gamut G3 indicated by 1.1, 1.2, and 1.3, respectively, of FIG. 7 is the same at a point where the new target color gamut G2 is wider than the verified target color gamut G1.

The relationship in the magnitude of the verified target color gamut G1, the new target color gamut G2, and the printer color gamut G3 is determined by referring to each multi-dimension LUT included in the verified target profile, new target profile, and printer profile saved in the storage unit 202 of the controller 20 and comparing each color gamut.

In a case where the relationship is satisfied among the verified target color gamut G1, the new target color gamut G2, and the printer color gamut G3 indicated by 1.1, 1.2, and 1.3, respectively, the method for estimating the color matching precision of the new target color gamut point and whether it is necessary to generate the patch or not will be hereinafter described.

The relationship in the magnitude of the verified target color gamut G1, the new target color gamut G2, and the printer color gamut G3 indicated by 1.1 is as follows: the printer color gamut G3<the verified target color gamut G1<the new target color gamut G2. In this relationship, a distance A between the achromatic color point and the verified target color gamut point on the boundary of the verified target color gamut G1 and having the same hue as the new target color gamut point on the boundary of the new target color gamut G2 is less than a distance X between the new target color gamut point and the achromatic color point. A distance B between the achromatic color point and the printer color gamut point on the boundary of the printer color gamut G3 and having the same hue as the new target color gamut point is less than the distance A and the distance X.

In the relationship of 1.1, the new target color gamut G2 is wider than the verified target color gamut G1, and therefore, the new target color gamut G2 is not included in the verified target color gamut G1. Therefore, the color matching precision has not been verified for new target color gamut points in the new target color gamut G2 outside of the verified target color gamut G1 (new target color gamut point existing in a shaded area of FIG. 7).

However, in the relationship indicated by 1.1, the printer color gamut G3 is narrower than the verified target color gamut G1 and new target color gamut G2. Therefore, the verified target color gamut point on the boundary of the verified target color gamut G1 (outline circle of FIG. 7) can be mapped to the printer color gamut point on the boundary of the printer color gamut G3 (outline square). The new target color gamut point (outline triangle) having the same hue as the verified target color gamut point (outline circle) is mapped to the same printer color gamut point (outline square) as the printer color gamut point (outline square) to which the verified target color gamut point (outline circle) is mapped. Therefore, since the measured color value (X mark) of the verified target color gamut point (outline circle) mapped to the same printer color gamut point (outline square) as the printer color gamut point (outline square) to which the new target color gamut point (outline triangle) is mapped, is already measured, the measured color value (X mark) can be deemed as the measured color value of the new target color gamut point (outline triangle) without printing and measuring the color of the patch of the new target color gamut point (outline triangle). Then, the color difference ΔE between a measured color value ($L^*_1$, $a^*_1$, $b^*_1$) indicated by X mark deemed as the measured color value of the new target color gamut point (outline triangle) and an L*a*b*value ($L^*_2$, $a^*_2$, $b^*_2$) of the new target color gamut point (outline triangle) which is the reference value can be calculated according to the following expression (2) as the color matching precision for the new target color gamut point (outline triangle).

$$\Delta E = ((L^*_1 - L^*_2)^2 + (a^*_1 - a^*_2)^2 + (b^*_1 - b^*_2)^2)^{0.5} \quad (2)$$

As described above, in the relationship of 1.1, the color difference of the non-verified new target area is estimated from the measured color value of the verified target color gamut point in view of the color gamut G3 of the printer. Accordingly, the number of patches for measuring the color can be further reduced, and the efficiency in the verification of the color matching precision can be further improved.

The estimation of the color matching precision of the new target color gamut point in the relationship of 1.1 is done according to the steps of (1) to (3) below.

(1) Using the multi-dimension LUT of the printer profile, the mapping angle by which the verified target color gamut point (outline circle) on the boundary of the verified target color gamut G1 is mapped to the printer color gamut G3 is calculated.

(2) The new target color gamut point (outline triangle) in the new target color gamut G2 having the same hue as the verified target color gamut point (outline circle) after the mapping is calculated using the mapping angle calculated in (1).

(3) The verified target color gamut point (outline circle) is theoretically printed by the printer 30 in the color at the printer color gamut point (outline square) after the mapping, however, the measured color value of the patch at the verified target color gamut point (outline circle) actually output from the printer 30 is the measured color value of the X mark.

Therefore, the color difference between the new target color gamut point (outline triangle) calculated in (2) and the measured color value of the X mark is calculated as the color matching precision of the new target color gamut point (outline triangle).

In the relationship of 1.1, the color matching precision of the new target color gamut point (outline triangle) can be estimated, and therefore, it is determined that it is not necessary to generate the difference patch.

It should be noted that the number of non-verified new target color gamut points satisfying the relationship of 1.1 (hereinafter referred to as "particular new target color gamut point") is equal to or less than the predetermined threshold value, the patches for the particular new target points may be generated, and the color matching precision of the particular new target points may be verified through the measurement of the color. In this case, the patches of the particular new target color gamut points may be included in the chart of the difference patches, so that the color may be measured together with the difference patches. Therefore, while flexibly satisfying the demand of the customer, the color of the patches can be measured efficiently. The threshold value for the particular new target color gamut point may be, for example, 1% of the number of new target color gamut points included in the new target color gamut G2.

The relationship in the magnitude of the verified target color gamut G1, the new target color gamut G2, and the printer color gamut G3 shown in 1.2 is as follows: the verified target color gamut G1<the printer color gamut G3<the new target color gamut G2. In this relationship, like 1.1, the new target color gamut G2 is wider than the verified target color gamut G1, and therefore, the new target color gamut G2 is not included in the verified target color gamut G1. Therefore, the color matching precision has not been verified for new target color gamut points in the new target color gamut G2 outside of the verified target color gamut G1. Since the verified target color gamut G1 is narrower than the printer color gamut G3, the verified target color gamut point cannot be mapped to the printer color gamut G3, and therefore, the mapping angle cannot be calculated.

Therefore, in the relationship of 1.2, the measured color value at the new verification target color gamut point is measured by generating the difference patches and printing and measuring the color. Then, the color difference between the measured color value thus measured and the new verification target color gamut point which is the reference value is calculated as the color matching precision of the new verification target color gamut point.

The relationship in the magnitude of the verified target color gamut G1, the new target color gamut G2, and the printer color gamut G3 as shown in 1.3 is as follows: the verified target color gamut G1<the new target color gamut G2<the printer color gamut G3. In this relationship, like 1.1, 1.2, the new target color gamut G2 is wider than the verified target color gamut G1, and therefore, the new target color gamut G2 is not included in the verified target color gamut G1. Therefore, the color matching precision has not been verified for new target color gamut points in the new target color gamut G2 outside of the verified target color gamut G1. Since the verified target color gamut G1 is narrower than the printer color gamut G3, the verified target color gamut point cannot be mapped to the printer color gamut G3, and therefore, the mapping angle cannot be calculated.

Therefore, in the relationship of 1.3, like 1.2, the measured color value of the new verification target color gamut point is measured by generating difference patches and measuring the color. Then, the color difference between the measured color value thus measured and the new verification target color gamut point which is the reference value is calculated as the color matching precision of the new verification target color gamut point.

The verified target color gamut G1 is constituted by merging multiple verified target color gamuts. More specifically, the verified target color gamut G1 may include at least part of the multiple verified target color gamuts. Therefore, the verified target color gamut is wider, and this can reduce the number of new target color gamut points for which the color matching precisions are estimated and the number of new target color gamut points for which it is necessary to generate difference patches, and therefore, the amount of calculation required for estimation of the color matching precision is reduced and the time required for measuring the color of the difference patches and the like is reduced, so that more efficient verification of the color matching precision can be realized.

The relationship in the magnitude of the verified target color gamut G1, the new target color gamut G2, and the printer color gamut G3 as shown in the relationship of 2 is as follows: the printer color gamut G3<the new target color gamut G2<the verified target color gamut G1, and unlike 1.1 to 1.3, the new target color gamut G2 is narrower than the verified target color gamut G1. In this relationship, the new target color gamut G2 is included in the verified target color gamut G1 so that the new target color gamut G2 overlaps the verified target color gamut G1. Therefore, the verification of the color matching precision has already been done in the range of the new target color gamut G2.

When the number of new target color gamut points for which the color matching precisions are required to be verified in the new target color gamut G2 is relatively high, it may be necessary to derive the color difference from the reference value for the new target color gamut point even in the relationship of 2. In this case, the color difference from the reference value for the new target color gamut point in the relationship of 2 can be estimated through calculation as follows.

Figure 8:
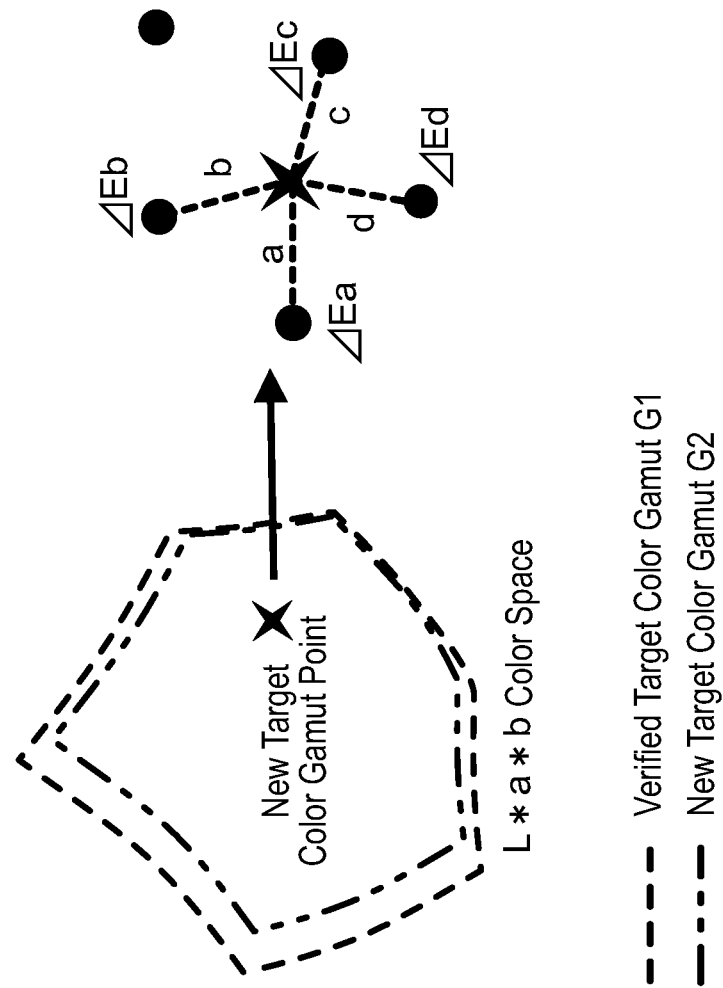
FIG. 8 is an explanatory diagram showing a calculation method of color differences from a reference value for a new target color gamut point in a portion where a new target color gamut overlaps a verified target color gamut.

FIG. 8 is an explanatory diagram illustrating a calculation method for calculating color differences from the reference value of the new target color gamut point in a portion where the new target color gamut G2 overlaps the verified target color gamut G1.

The color difference $\Delta E$ from the reference value for the new target color gamut point in the relationship of 2 is calculated according to the steps of (1), (2) below.

(1) The distances a, b, c, d in the $L^*a^*b^*$ color space from multiple verified target color gamut points (for example, four verified target color gamut points) (black circles) near the new target color gamut point (star mark in FIG. 8) where the color difference from the reference value is to be estimated, to the new target color gamut point, are calculated.

(2) An average value of the color differences $\Delta E_a$, $\Delta E_b$, $\Delta E_c$, $\Delta E_d$ of the verified target color gamut points (black circles) for which the color differences from the reference value have already been verified and which are weighted by the distances a, b, c, d calculated in (1) is calculated as the color difference $\Delta E$ from the reference value at the new target color gamut point (star mark) according to the following expression (3).

$$\Delta E = (a^{-1}\Delta E_a + b^{-1}\Delta E_b + c^{-1}\Delta E_c + d^{-1}\Delta E_d)/(a^{-1}+b^{-1}+c^{-1}+d^{-1}) \quad (3)$$

In the relationship of 2, the color matching precision can be estimated at the new target color gamut point (star mark), and therefore, it is determined that it is not necessary to generate a difference patch.

The relationship between the verified target color gamut G1, the new target color gamut G2, and the printer color gamut G3 as shown in FIG. 7 is displayed on the display unit 404 of the color matching precision calculation apparatus 40 using a GUI (Graphical User Interface), or is transmitted to the print instruction terminal 10 so that it is displayed on the display unit 104 of the print instruction terminal 10. Therefore, the relationship between the verified target color gamut G1, the new target color gamut G2, and the printer color gamut G3 can be visually confirmed, and this allows a user to roughly find the number of difference patches required to be generated, the number of steps required to measure the color of the difference patches, and the like.

Back to FIG. 5, explanation will be continued. The color matching precision calculation unit 4022 calculates the color difference between the measured color value of the difference patch generated by the difference patch generation unit 4020 and the new target color gamut point which is the reference value corresponding to each difference patch. The color matching precision calculation unit 4022 merges the color differences calculated for the new target color gamut points, the color differences calculated by the estimate precision calculation unit 4021, and the verified color differences of the new target color gamut points which are included in the verified target color gamut points. The color matching precision calculation unit 4022 calculates, as the color matching precision of the entire new target color gamut, the average of the color differences from the reference value for all the new target color gamut points in the new target color gamut obtained by the merger.

According to the above configuration, the color matching precision calculation apparatus 40 receives the verified target profile, the new target profile, and the printer profile from the controller 20. Then, the color matching precision calculation apparatus 40 refers to the verified target profile, the new target profile, and the printer profile, which are received, so as to determine the relationship in the magnitude of the verified target color gamut G1, the new target color gamut G2, and the printer color gamut G3.

When the relationship in the magnitude of the verified target color gamut G1, the new target color gamut G2, and the printer color gamut G3 is determined to satisfy the printer color gamut G3<the verified target color gamut G1<the new target color gamut G2, the color matching precision calculation apparatus 40 calculates the new target color gamut point having the same hue as the verified target color gamut point. Then, the color matching precision calculation apparatus 40 calculates, as the color matching precision for the new target color gamut point, the color difference between the calculated new target color gamut point and the measured color value of the verified target color gamut point.

Figure 9A:
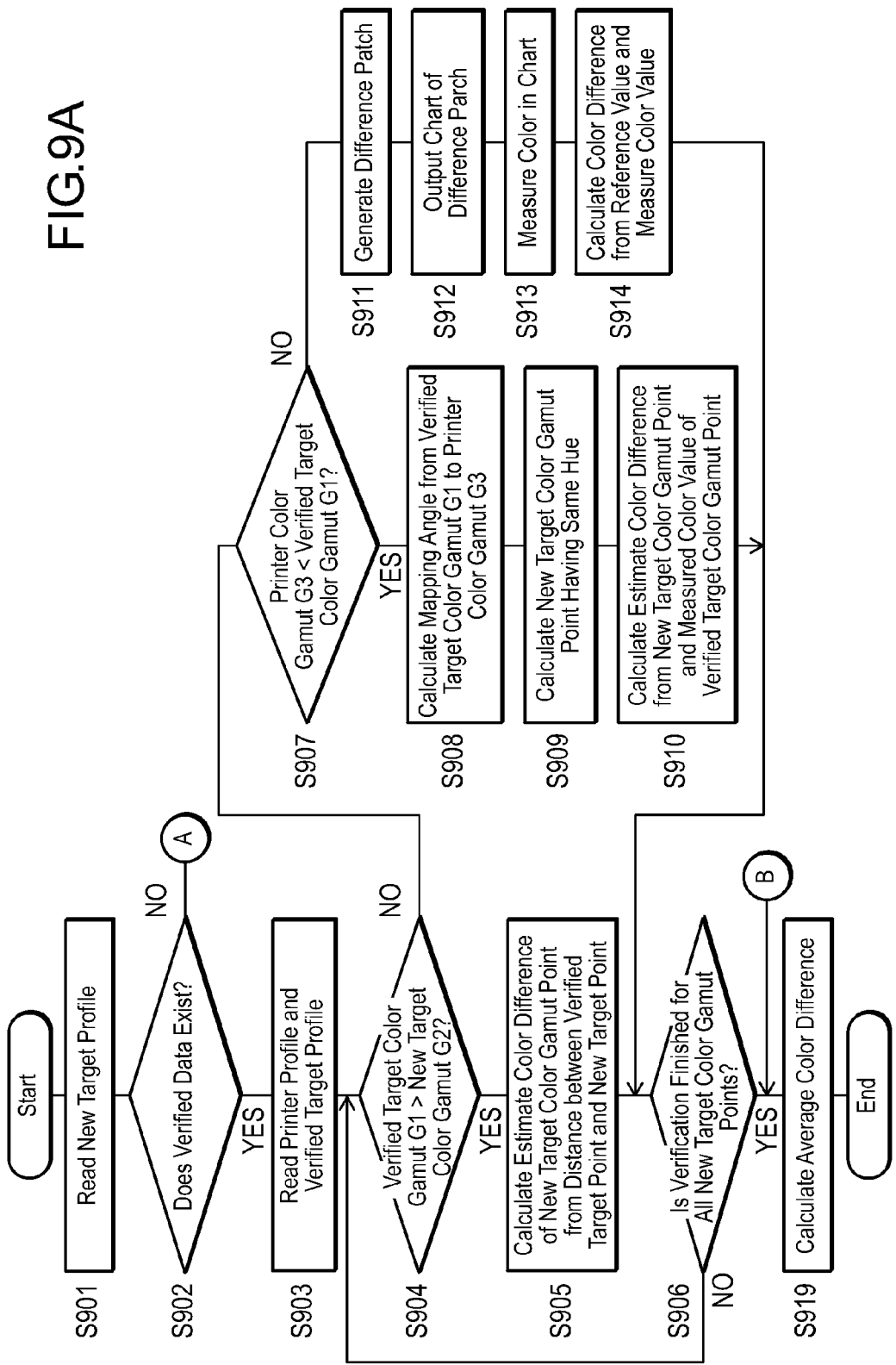
FIG. 9A is a flowchart for performing a method for verifying the color matching precision according to an embodiment of the present invention.
Figure 9B:
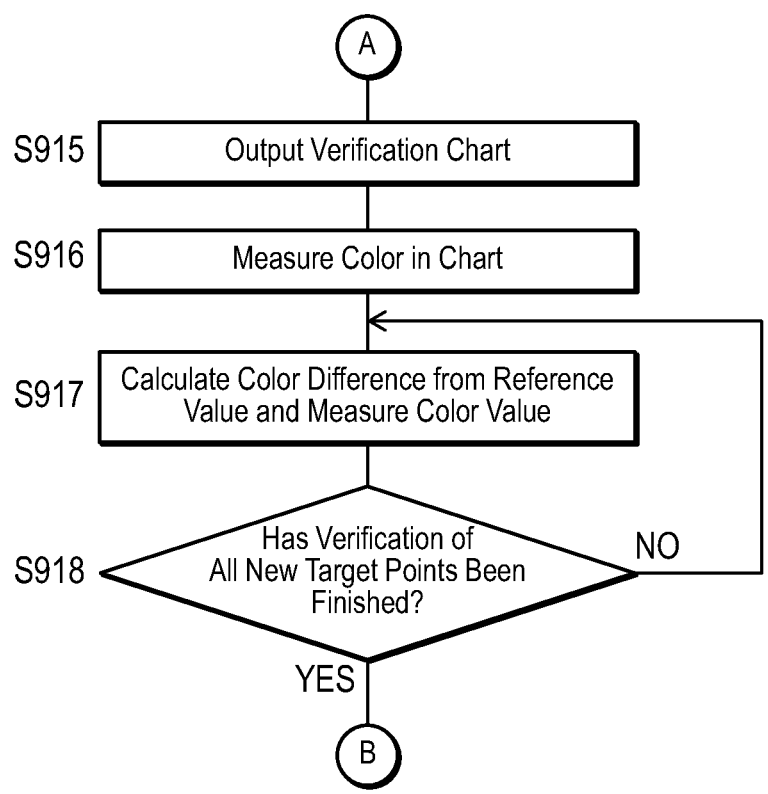
FIG. 9B is a flowchart for performing a method for verifying the color matching precision according to an embodiment of the present invention.

FIGS. 9A and 9B are flowcharts for performing the method for verifying the color matching precision according to the present embodiment. This flowchart can be performed by the program for the image forming system which is stored in the storage unit 402 of the color matching precision calculation apparatus 40 of the image forming system 1 and which constitutes difference patch generation unit 4020, estimate precision calculation unit 4021, and color matching precision calculation unit 4022.

The CPU 400 of the color matching precision calculation apparatus 40 receives and reads the new target profile from the controller 20 (S901).

The CPU 400 determines whether data of the color matching precision of the verified target color gamut G1 exist in the storage unit 402 or not (S902).

When the CPU 400 determines that there is not data of the color matching precision for the verified target color gamut (S902: NO), the CPU 400 transmits, to the controller 20, the chart including patches for all the new target color gamut points in the new target color gamut, and outputs the chart from the printer 30 (S915). When the color measuring device 50 measures the color of each patch in the chart which is output (S916), the CPU 400 receives the measured color value from the color measuring device 50, and calculates the color difference between the new target color gamut point which is the reference value and the corresponding measured color value, so as to verify the color matching precision for the new target color gamut point (S917). The verification of the color matching precision for the new target color gamut point is done for all the new target color gamut points (S918).

The CPU 400 determines that there is data of the color matching precision for the verified target color gamut G1 (S902: YES), the CPU 400 receives and reads the verified target profile and the printer profile from the controller 20 (S903).

The CPU 400 determines the relationship in the magnitude of the verified target color gamut G1 and the new target color gamut G2 (S904). More specifically, the CPU 400 determines the relationship in the magnitude of the distance A between the achromatic color point and the verified target color gamut point on the boundary of the verified target color gamut G1 and having the same hue as the new target color gamut point on the boundary of the new target color gamut G2 and the distance X between the achromatic color point and the new target color gamut point.

When the CPU 400 determines that the verified target color gamut G1 is wider than the new target color gamut G2 (S904: YES), the CPU 400 estimates the color difference from the corresponding reference value for the new target color gamut point on the basis of multiple verified target color gamut points for which the color differences from the reference value have already been verified and each distance between the new target color gamut point and the multiple verified target color gamut points. More specifically, the CPU 400 calculates each distance between the new target color gamut point and the multiple verified target color gamut points which are verified, and calculates the average value of the color differences for the multiple verified target color gamut points, which are weighted by the calculated distances. Then, the CPU 400 estimates the calculated average value as the color difference from the reference value for the new target color gamut point (S905).

When the CPU 400 determines that the verified target color gamut G1 is not wider than the new target color gamut G2 (S904: NO), the CPU 400 determines the relationship in the magnitude of the verified target color gamut G1 and the printer color gamut G3. More specifically, the CPU 400 determines the relationship in the magnitude of the distance A between the achromatic color point and the verified target color gamut point on the boundary of the verified target color gamut G1 and having the same hue as the new target color gamut point on the boundary of the new target color gamut G2 and the distance B between the achromatic color point and the printer color gamut point on the boundary of the printer color gamut G3 and having the same hue as the new target color gamut point on the boundary of the new target color gamut G2.

When the CPU 400 determines that the verified target color gamut G1 is wider than the printer color gamut G3 (S907: YES), the CPU 400 calculates the hue which is the mapping angle from the verified target color gamut point on the boundary of the verified target color gamut G1 to the printer color gamut G3 (S908). The CPU 400 calculates the new target color gamut point having the same hue as the verified target color gamut point (S909). Then, the CPU 400 calculates the color difference between the calculated new target color gamut point and the measured color value of the verified target color gamut point having the same hue as the new target color gamut point, and estimates the calculated color difference as the color difference from the reference value for the new target color gamut point (S910).

When the CPU 400 determines that the verified target color gamut G1 is not wider than the printer color gamut G3 (S907: NO), the CPU 400 generates the difference patches (S911), and transmits a chart of the difference patches to the controller 20 and cause the printer 30 to print and output the chart (S912). The CPU 400 receives the measured color value of the difference patch of the chart for which the color is measured by the measuring device 50, and calculates, as the color difference from the reference value for the new target color gamut point, the color difference between the measured color value of the difference patch received and the new target color gamut point corresponding to the difference patch (S914).

The CPU 400 repeats steps S904 to S905, S907 to S914 for all the new target color gamut points until the color difference from the reference value is calculated (S906: NO).

When the color differences of all the new target color gamut points from the reference value have been calculated and the color matching precision of each new target color gamut point has been verified (S906: YES), the CPU 400 derives the average of the color differences from the reference value for all the new target color gamut points included in the new target color gamut G2, and calculates the average as the color matching precision of the entire new target color gamut G2 (S919).

The present embodiment achieves the following effects.

In the device-independent space, the relationship in the magnitude of the distance X, the distance A, and the distance B is determined, which are respectively distances between the achromatic color point and the new target color gamut point on the boundary of the new target color gamut, the verified target color gamut point on the boundary of the verified target color gamut, and the printer color gamut point on the boundary of the printer color gamut having the same hue. In a case where the distance X is determined to be more than the distance A and the distance B is determined to be less than the distance A and the distance X, the color matching precision of the new target color gamut point is verified by calculating the color difference between the new target color gamut point and the measured color value of the verified target color gamut point having the same hue as the new target color gamut point. Therefore, the color difference from the reference value for the non-verified new target gamut point is estimated from the measured color value of the verified target color gamut point in view of the printer color gamut, so that the number of patches for measuring the color can be further reduced, and the verification of the color matching precision can be achieved more efficiently.

The verified target color gamut includes at least part of a plurality of target color gamuts for which color matching precisions have already been verified. Therefore, this reduces the numbers of new target color gamut points for which color matching precisions are estimated and new target color gamut points for which the difference patches are required to be generated. Accordingly, this reduces the amount of calculation required for estimation of the color matching precision and the time required to measure the color of the difference patches and the like, and the verification of the color matching precision can be achieved more efficiently.

The relationship between the verified target color gamut, the new target color gamut, and the printer color gamut is displayed. Therefore, the relationship between the verified target color gamut, the new target color gamut, and the printer color gamut can be visually confirmed, and this allows the user to roughly find the number of difference patches required to be generated, the number of steps required to measure the color of the difference patches, and the like.

When the number of the particular new target color gamut points where the distance X is determined to be more than the distance A and the distance B is determined to be less than the distance A and the distance X in the relationship in the magnitude of the distance X, the distance A, is equal to or less than the predetermined threshold value, generating patches of the particular new target color gamut points and verifying the color matching precision of the particular new target point by measuring the color. At this occasion, patches of the particular new target color gamut points may be included in the chart of the difference patches, so that the color may be measured together with the difference patches. Therefore, while flexibly satisfying the demand of the customer, the color of the patches can be measured efficiently.

The method for verifying the color matching precision, and the storage medium stored with the program for the image forming system according to the embodiment of the present invention have been hereinabove explained, but the present invention is not limited to the above embodiment.

For example, in the above embodiment, the color matching precision of the new target color gamut point is estimated by calculating the color difference between the new target color gamut point and the measured color value of the verified target color gamut point on the boundary of the verified target color gamut and having the same hue as the new target color gamut point. However, the color matching precision of the new target color gamut point may also be estimated by calculating the color difference between the new target color gamut point and the measured color value of the verified target color gamut point in a portion other than the boundary of the verified target color gamut and having the same hue as the new target color gamut point.

A part or all of the functions achieved by the program according to the embodiment may be replaced and carried out by hardware such as a circuit.

What is claimed is:

1. A method for verifying a color matching precision, comprising the steps of:
   (a) determining, in a device-independent color space, a relationship in a magnitude of a distance X between an achromatic color point indicating an achromatic color and a new target color gamut point on a boundary of a new target color gamut for which color matching precision is newly verified, a distance A between said achromatic color point and a verified target color gamut point on a boundary of a verified target color gamut, for which color matching precision has already been verified, and having a same hue as said new target color gamut point, and a distance B between said achromatic color point and a printer color gamut point on a boundary of a printer color gamut, with which an image can be formed by a printer, and having the same hue as said new target color gamut point;
   (b) in a case where said distance X is determined to be more than said distance A and said distance B is determined to be less than said distance A and said distance X in said step (a), calculating said new target color gamut point having the same hue as said verified target color gamut point; and
   (c) calculating, as the color matching precision of said new target color gamut point, a color difference between said new target color gamut point calculated in said step (b) and a measured color value of an output given by said printer for said verified target color gamut point.

2. The method for verifying the color matching precision as claimed in claim 1, wherein said verified target color gamut includes at least part of a plurality of target color gamuts for which color matching precisions have already been verified.

3. The method for verifying the color matching precision as claimed in claim 1 further comprising:
   a step (d) of displaying a relationship between said verified target color gamut, said new target color gamut, and said printer color gamut.

4. The method for verifying the color matching precision as claimed in claim 1 further comprising:
   a step (e) of, in a case where a number of particular new target color gamut points, which are said new target color gamut points where said distance X is determined to be more than said distance A and said distance B is determined to be less than said distance A and said distance X in said step (a), is equal to or less than a predetermined threshold value, outputting patches of said particular new target color gamut points with said printer in such a manner that the patches are included in a same chart in which the patches of said new target color gamut point other than said particular new target color gamut points are included.

5. A non-transitory computer readable storage medium stored with a program, said program causing an image forming system to execute a process comprising the steps of:
   (a) determining, in a device-independent color space, a relationship in the magnitude of a distance X between an achromatic color point indicating an achromatic color and a new target color gamut point on a boundary of a new target color gamut for which color matching precision is newly verified, a distance A between said achromatic color point and a verified target color gamut point on a boundary of a verified target color gamut, for which color matching precision has already been verified, and having a same hue as said new target color gamut point, and a distance B between said achromatic color point and a printer color gamut point on a boundary of a printer color gamut, with which an image can be formed by a printer, and having the same hue as said new target color gamut point;
   (b) in a case where said distance X is determined to be more than said distance A and said distance B is determined to be less than said distance A and said distance X in said process (a), calculating said new target color gamut point and said printer color gamut point having the same hue as said verified target color gamut point; and
   (c) calculating, as the color matching precision of said new target color gamut point, a color difference between said new target color gamut point calculated in said process (b) and a measured color value of an output given by said printer for said verified target color gamut point.

6. The program as claimed in claim 5, wherein said verified target color gamut includes at least part of a plurality of target color gamuts for which color matching precisions have already been verified.

7. The program as claimed in claim 5, wherein said process further comprising:
   a process (d) of displaying a relationship between said verified target color gamut, said new target color gamut, and said printer color gamut.

8. The program as claimed in claim 5, wherein said process further comprising:

a process (e) of, in a case where a number of particular new target color gamut points, which are said new target color gamut points where said distance X is determined to be more than said distance A and said distance B is determined to be less than said distance A and said distance X in said process (a), is equal to or less than a predetermined threshold value, outputting patches of said particular new target color gamut points by said printer in such a manner that the patches are included in a same chart in which the patches of said new target color gamut point other than said particular new target color gamut points are included.

* * * * *